United States Patent [19]
Klee

[11] 3,828,952
[45] Aug. 13, 1974

[54] COMPACT MATERIAL-HANDLING LOADER

[75] Inventor: Maurice Klee, Burlington, Iowa

[73] Assignee: J. I. Case Company, Racine, Wis.

[22] Filed: June 19, 1972

[21] Appl. No.: 264,263

[52] U.S. Cl............... 214/140, 180/54 A, 180/68 R
[51] Int. Cl............................................. B66f 9/00
[58] Field of Search.......... 180/54 A, 68 R; 214/140

[56] References Cited
UNITED STATES PATENTS
| | | | |
|---|---|---|---|
| 2,250,795 | 7/1941 | Fitzgerald | 180/68 R |
| 3,231,117 | 1/1966 | Melroe | 180/6.66 |
| 3,715,001 | 2/1973 | Wilson | 180/68 R |

Primary Examiner—Robert J. Spar
Assistant Examiner—John Mannix
Attorney, Agent, or Firm—Arthur J. Hansmann

[57] ABSTRACT

A compact material-handling loader including a vehicle body having ground supporting wheels thereon and having upstanding stanchions and arms pivotally connected thereto and supporting a loader bucket forwardly of the vehicle. An operator's seat is disposed between the pivotal arms, and an engine is at the lower rear end of the vehicle body. The vehicle body defines a compartment above the engine, and a radiator is disposed in the compartment but neither the radiator nor the vehicle body extends up to the upper ends of the stanchions, so the low silhoutte and compact nature of the compact loader is retained while the engine is a water-cooled engine and has a water-cooling type of radiator connected therewith.

2 Claims, 2 Drawing Figures

PATENTED AUG 13 1974  3,828,952

COMPACT MATERIAL-HANDLING LOADER

This invention relates to a compact material-handling loader, and, more particularly, it relates to a material-handling loader of the type which has ground supporting wheels for propelling and maneuvering the loader, and it has arms pivotally mounted on opposite sides of the operator's seat, and the entire loader presents a low silhouette and a compact structure for use in positions where there is only a very confined space for accommodating the entire vehicle.

BACKGROUND OF THE INVENTION

Compact material-handling loaders which have a low silhouette and a very compact arrangement for the narrowest width and the shortest length for a given capacity of loader, are already known in the art. These loaders commonly have a forwardly disposed loader bucket which is pivotally mounted on the loader by means of two arms extending on opposite sides of the operator's seat, and the arms actually pass the operator's head as they pivot up and down in raising and lowering the bucket. Also, these loaders are designed to operate in very confined spaces, and they have a low silhouette so that the operator can obtain optimum visability of the supporting floor or ground on which the vehicle is operating. That is, even the rear end or rear wall of the vehicle is arranged in a low silhouette so that the operator can look over the wall while still sitting in his seat and observe the floor at the rear of the vehicle.

This type of prior art loader is therefore arranged with a minimum size vehicle body, to present the low silhouette and compact body dimensions referred to, but, the loader must nevertheless be sufficiently large to support the load in and the weight of the loader bucket itself. In the prior art compact loaders, in order to provide the compact design and yet counterbalance the loader bucket, the engine is disposed rearwardly of the loader. Because of the limited vehicle size, the prior art engines have been of the air-cooled type, and this type is limited in its own capacity.

Accordingly, it is a general object of this invention to provide a compact loader which has the same desirable compact size of the prior art loaders but which is susceptible to accommodating and providing for a water-cooled type of engine. This invention therefore provides a compact loader which can accommodate a water-cooled engine which therefore has a water-to-air type of radiator, with both the engine and the radiator disposed within the limited dimensions of the vehicle body and without interfering with the low silhouette or the overall compactness of the vehicle.

Additionally, it is an object of this invention to achieve the aforementioned objective and to provide air fans for moving the air over the radiator and for exhausting the air relative to the vehicle body and having the fans mounted remote from the engine but being driven by the engine through a fan belt disposed in a plane passing adjacent the engine.

In accomplishing the aforementioned objectives, the vehicle body is arranged with a compartment directly above the engine and the radiator is disposed in that compartment and has water-confining tubes which are horizontally disposed and thus the longer dimension of the radiator is extending along the width of the vehicle and therefore does not interfere with the compactness of the vehicle and the low silhouette thereof. Further, the arrangement is such that the radiator compartment is adjacent a grille on the rear wall of the vehicle body, and two spaced-apart fans are mounted on the body and are adjacent the grille for moving the air over the radiator and through the grille, all in a compact arrangement and one which results in providing a large capacity water-cooled engine, and with the resulting arrangement being a highly efficient unit.

Other objects and advantages will become apparent upon reading the following disclosure.

DETAILED DESCRIPTION OF THE PREFERRED EMBODIMENT

Figure 1:
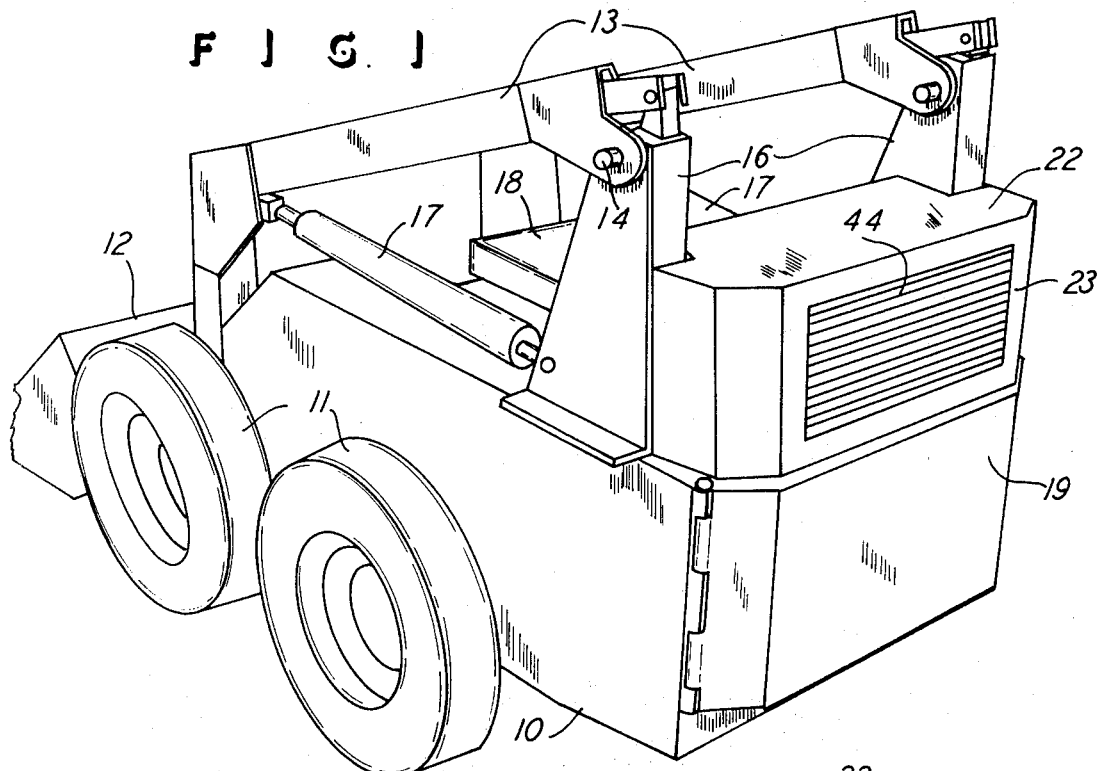
FIG. 1 is a rear perspective view of a compact loader of this invention.

The drawings show a compact material handling loader of the type which has a vehicle body 10 and ground engaging wheels 11 for propelling and maneuvering the body 10. A front-end loader bucket 12 is pivotally supported on the body 10 by means of a pair of lift arms 13 pivoted at pins 14 on stanchions 16 which are spaced apart and are at opposite sides of the loader machine shown. Power cylinders 17 connect to the front ends of the pivot arms 13 for raising and lowering the arms 13 and the loader bucket 12. An operator's seat 18 is supported on the vehicle body, and the operator is thus positioned to face toward the loader bucket 12. The vehicle body 10 has a rear wall 19, and it defines a lower engine compartment 21, and the vehicle body has a rear top wall 22 which terminates below the upper ends of the stanchions 16 so that the operator can turn around and still view the ground or floor immediately to the rear of the vehicle since the top wall 22 is low and thus presents the low silhouette of the vehicle.

Figure 2:
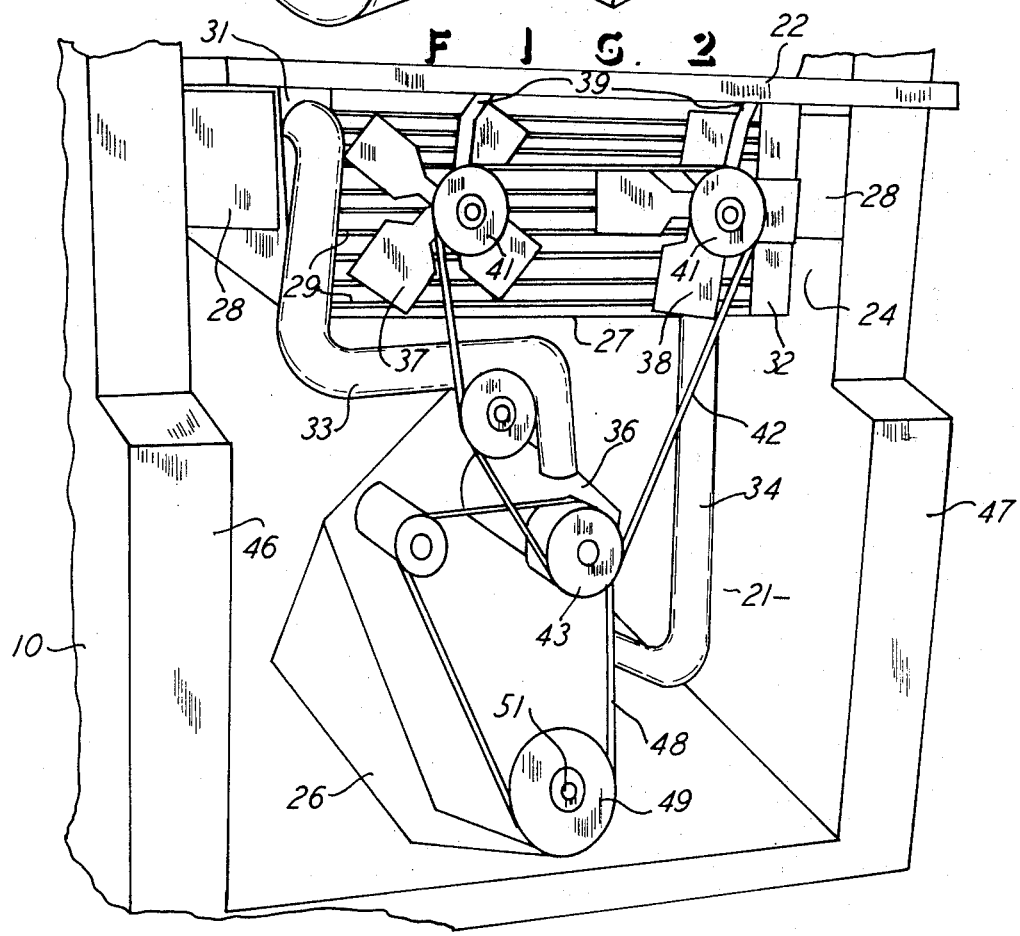
FIG. 2 is an enlarged rear perspective view of the interior rear end of the vehicle shown in FIG. 1 and with the engine and radiator shown therein.

The aforementioned describes a substantially conventional arrangement of a compact loader. FIG. 2 shows the rear end of the loader with the rear body portions or rear wall removed so that the rear wall 19 and the upper rear wall 23 are removed to expose the engine compartment 21 and an upper compartment 24 which is directly above the engine compartment 21. Thus the vehicle body 10 is arranged so that the engine 26 in the compartment 21 is located at the rear end of the vehicle and thus opposite the forwardly located loader bucket 12, and thus the entire loader is substantially balanced relative to its wheels 11, for stability purposes. However, these compact loaders as known heretofore did not have sufficient space or arrangement to accommodate a water-cooled engine and a radiator necessitated by the water-cooled engine. Instead, the prior art loaders have air-cooled engines, and such engines are of limited capacity and therefore the entire loader was limited in its power and capacity.

The present invention utilizes a water-cooled engine 26, and the vehicle body 10 is arranged so that the compartment 24 is presented directly above the engine 26, and the compartment 24 has a large horizontal dimension extending along the width of the vehicle and it has a short vertical or height dimension extending from the compartment 21 and up to the upper wall 22. Thus the low silhouette for the entire vehicle is maintained, but provision is made for accommodating an air-to-water type of radiator 27 mounted in the rectilinear shaped compartment 24, as described. Thus, mounting brackets 28 extend between the radiator 27 and the vehicle body 10 to support the radiator 27 in its horizontal position, and the radiator 27 thus has its plurality of water tubes 29 disposed with the longitudinal axes horizontal and extending along the width of the vehicle body 10, as seen in FIG. 2. The radiator 27 may be of a conventional arrangement having the usual radiator headers 31 and 32 at opposite ends of the radiator, such as shown. Thus, in the usual manner of the function of a horizontally disposed radiator of the air and water type, water can enter one of the headers 31 and 32 and it can leave through the other of the headers 31 and 32, and air can flow over the tubes 29 and through the usual fins which would be disposed between the tubes 29. The radiator 27 is suspended in the compartment 24 by means of the brackets 28, and the radiator 27 is directly above the engine 26, and the arrangement is therefore compact relative to the engine 26 and the radiator 27 and the low silhouette as defined by upper wall 22 of the vehicle body. Water hoses 33 and 34 respectively connect to the headers 31 and 32, and they also connect to the water-cooled engine 26, in the conventional way of connecting thereto, and a water pump 36 is shown on the engine 26. Thus water is circulated through the engine 26 and through the radiator 27, for the well-known system of engine cooling by means of the water-type radiator.

Air fans 37 and 38 are also disposed in the compartment 24 and they are suspended from the vehicle body 10 by means of the support arms 39 shown extending from the top wall 22 and down to the respective fans 37 and 38. Thus the fans 37 and 38 are adjacent the radiator 27 to move air over the radiator 27 in the usual manner of air flow relative to the radiator. Also, the fans 37 and 38 have driven pulleys 41 which have a fan belt 42 trained thereon, and the belt 42 extends to a driving pulley 43 on the engine 26. Thus the fan belt 42 is in one vertical plane so that the pulleys 41 and 43 are disposed in that vertical plane. That is, the arrangement is such that the pulleys 41 are directly above the pulley 43, and thus no intervening angular drives, intermediate drives or jack shafts, or the like, are required, but there is the compact and simplified direct drive of the fans 37 and 38 from the engine 26, as shown and described.

The vehicle body 10 has the rear wall 19 which encloses the rear of the engine compartment 21, and it also has the rear wall 23 which encloses the rear of the radiator compartment 24. Further, the wall 23 has a grille 44 disposed immediately adjacent the fans 37 and 38 so that air can flow through the grille 44 relative to the fans 37 and 38.

It will therefore be understood that the low silhouette and compactness of the vehicle is maintained while providing a water-cooled engine and a radiator, both of which were heretofore expected to be too bulky to be accommodated in this type of loader. However, with the relationship of the radiator and the engine as shown and described, the radiator can be accommodated and the air fans can be included and driven from the engine and have an air grille disposed appropriately for air flow relative to the fans. The radiator compartment 24 is itself compact and has a short height but a substantial width to accommodate the horizontal type of radiator described. The provision of two fans 37 and 38 in side-by-side relationship and immediately adjacent the radiator 27 permit sufficient air flow through the radiator 27 while maintaining the compactness of the arrangement described, and no additional space is required for baffling or shrouding relative to the radiator 27 to direct air thereover, and also the two fans are driven directly from the engine 26 while providing the sufficient capacity of air flow, as just mentioned. Of course the compartments 21 and 24 are laterally defined by the vehicle sides designated 46 and 47. Also, it will be seen and understood that the engine water pump 36 is of conventional arrangement and is driven by the belt 48 trained on the pulley 43 and on a pulley 49 on the engine shaft 51. Also, the engine may be cooled by a liquid other than water, and therefore that other liquid would be flowing through the radiator, so the engine can be referred to as a liquid-cooled engine.

What is claimed is:

1. In a compact material-handling loader of the type including an enclosure type of vehicle body, ground supporting wheels on said body, a loader bucket, a pair of spaced-apart stanchions upstanding from said body, arms pivotally mounted on said stanchions for supporting said bucket forwardly of said body, an engine on said body at the rear thereof, and an operator's seat between said arms and at an elevation higher than said engine, the improvement comprising said engine being a liquid-cooled engine and including a liquid pump, said body having walls including a rear wall extending past said engine rearwardly thereof and extending upwardly in an upper portion to define a compartment at a location directly above said engine and rearwardly of said seat and between said stanchions but at an elevation below the upper ends of said stanchions, an air grille on said upper portion and opening into said compartment, a liquid-to-air radiator disposed in said compartment to be directly above said engine and adjacent said air grille, liquid hoses connected between said engine and said radiator for the flow of cooling liquid therebetween, air fan means mounted on said body and disposed in said compartment between said radiator and said air grille to move air over said radiator, a fan belt connected between said fan means and said engine for driving said fan means, said engine including a fan belt drive, said fan means being two spaced-apart fans disposed directly above said fan belt drive, said fan belt being planarly trained between said fan belt drive and said fan means, and said radiator being a tube-and-fin type and the tubes thereof are horizontally disposed in the direction of the width of said vehicle body.

2. The compact loader as claimed in claim 1, wherein said compartment is of a shape having a horizontal dimension across the width of said vehicle body substantially larger than the vertical dimension of said vehicle body, and said radiator having liquid-confining tubes which are disposed with their longitudinal axes horizontal and oriented along said width, to have said radiator occupy the major portion of said compartment and be of a maximum capacity.

* * * * *